R. R. HAGE.
GATE ACTUATING MECHANISM.
APPLICATION FILED JULY 16, 1908.

908,563.

Patented Jan. 5, 1909.

3 SHEETS—SHEET 3.

Witnesses:
L. G. Zesbaugh
W. H. Souba

Inventor:
ROBERT R. HAGE
By his Attorneys
Williamson Merchant

UNITED STATES PATENT OFFICE.

ROBERT R. HAGE, OF CULBERTSON, MONTANA.

GATE-ACTUATING MECHANISM.

No. 908,563. Specification of Letters Patent. Patented Jan. 5, 1909.

Application filed July 16, 1908. Serial No. 443,833.

*To all whom it may concern:*

Be it known that I, ROBERT R. HAGE, a citizen of the United States, residing at Culbertson, in the county of Valley and State of Montana, have invented certain new and useful Improvements in Gate-Actuating Mechanism; and I do hereby declare the following to be a full, clear, and exact description of the invention, such as will enable others skilled in the art to which it appertains to make and use the same.

My invention has for its object to provide an improved means for actuating farm gates or gates arranged to open and close driveways, and to this end it consists of the novel devices and combinations of devices hereinafter described and defined in the claims.

In the accompanying drawings which illustrate the invention, like characters indicate like parts throughout the several views.

Figure 1:
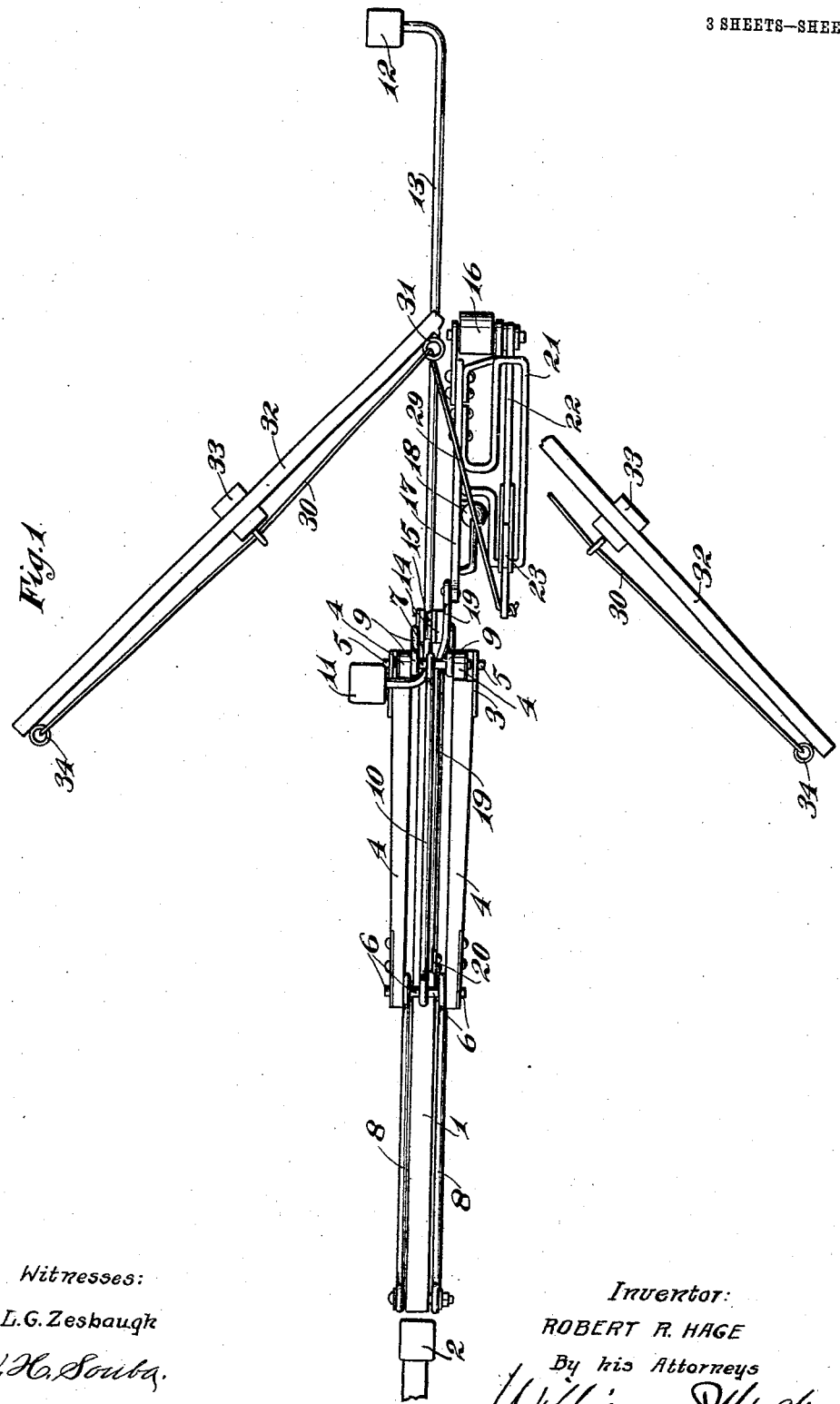
Figure 2:
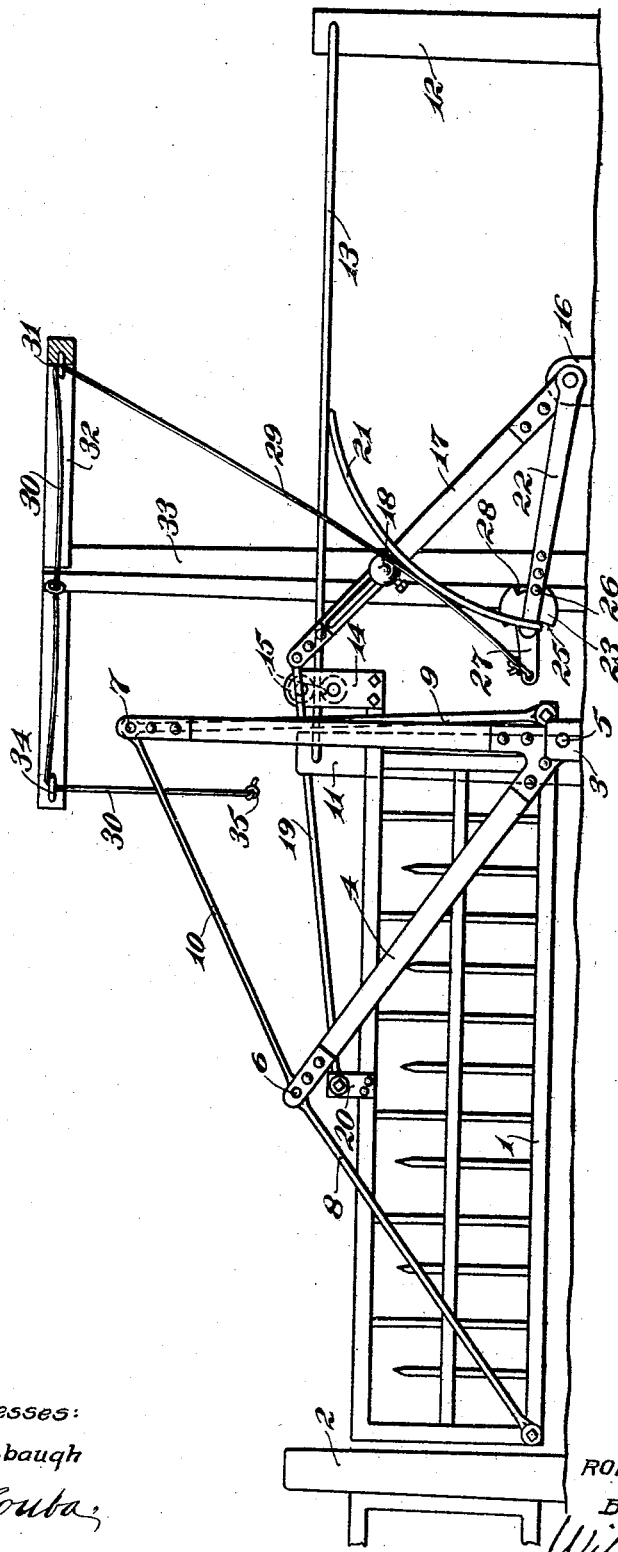
Figure 3:
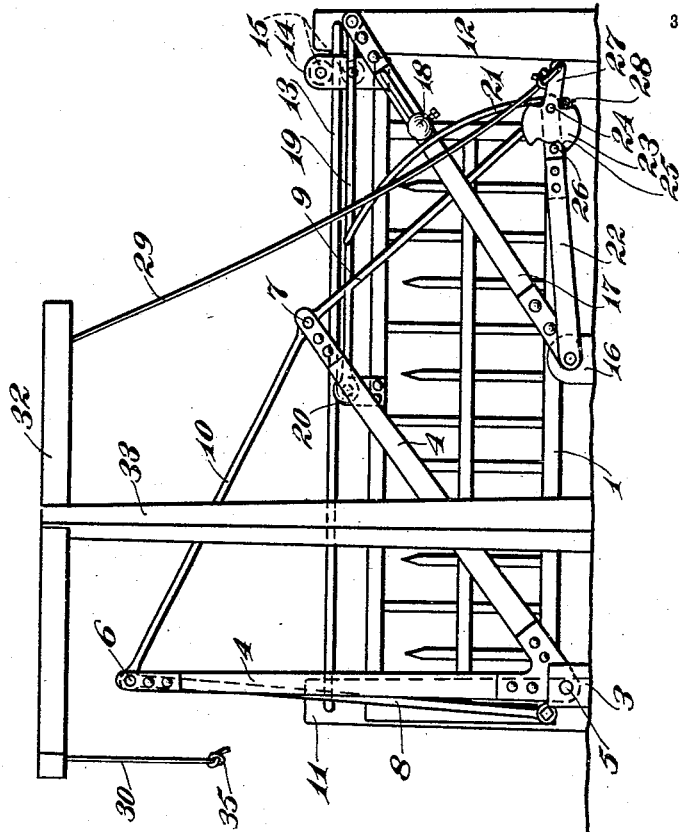

Referring to the drawings, Figure 1 is a plan view, showing the improved gate and means for operating the same, some parts being broken away. Fig. 2 is a side elevation of the parts shown in Fig. 1, showing the gate in a closed position; and Fig. 3 is a view corresponding to Fig. 2, but showing the gate in an open position, some parts being broken away.

The numeral 1 indicates the gate, which is arranged to move endwise upward and from a gate post 2 located at one side of the driveway, and at the other side of which driveway are laterally spaced stub posts or bearings 3 to which the lower end of a V-shaped gate supporting frame 4 is pivotally connected, by a rod 5. This V-shaped gate supporting frame 4 is made up of two V-shaped sections, located one on each side of the gate, with the free ends of their upwardly extended arms tied together but spaced apart by bolts or rods 6 and 7. The outer end of the gate 1 is suspended from the tie bolt 6 by a pair of laterally spaced links 8; and, likewise, the inner end of the gate is suspended from the tie bolt 7 by laterally spaced links 9, the said links 8 and 9 being, as shown, pivotally attached to the lower end corners of the said gate. The tie bolts 6 and 7 are connected by a brace rod 10. At one side of the gate is a pair of posts 11 and 12, the former of which is located close to the stub posts 3, and the other of which is located beyond the position occupied by the inner end of the gate when the gate is moved into its open position, shown in Fig. 3. These posts 11 and 12 support a horizontal guide rail 13, shown as afforded by a rod having laterally bent ends directly secured to the upper ends of said posts. To the inner end of the gate 1 is attached a bearing 14 having a pair of guide wheels 15, one of which engages the upper and the other the lower surface of the guide rail 13, and thereby supports the rear or inner end portion of the gate for horizontal traveling movement. When the gate is in its closed position shown in Fig. 2, the guide rail 13, acting on the lower roller 15, holds the inner end of the gate against upward rocking movement; and when the gate is in its open position, shown in Fig. 3, said guide rod and upper roller hold the inner end of the gate against downward rocking movement.

Pivoted to a stub post 16 located laterally outward from the stub post 3 is a weighted gate actuating lever 17 provided with a weight 18 that is preferably adjustable thereon. The free upper end of this lever 17 is connected, by a link 19, to a bearing 20 on the intermediate upper portion of the gate 1. This lever 17 carries a transversely extended loop or slotted latch frame 21 which, as shown, is of segmental form and is shown as made from a light rod or piece of heavy wire. Also pivoted to the said stub post 16 and working freely within the loop 21, is a latch lever 22, to the inner end of which a double-acting latch dog 23 is pivoted, at 24. This latch dog 23 has a segmental notch 25 that coöperates with a stop 26 on said lever 22 to limit the movement of said latch dog in respect to said lever. Also said latch dog is provided with a projecting arm 27 and with catch shoulders 28 on opposite sides of the said arm. These catch shoulders 28 are adapted to operate on the extreme end portions of the loop 21, as will presently be more fully described. The arm 27 is connected to one end of a rope 29, which rope has branches 30. The rope 29 is extended through an eye 31 secured in the angle of a horizontally disposed V-shaped frame support 32, the arms of which are supported by long posts 33. The projecting arms of the support 32 are located close to one side of the drive-way, one on each side of the gate, and they are provided with guide eyes 34, through which the depending ends of the branch ropes 30 are passed. The depending ends of said ropes are shown as knotted at 35 to afford suitable handpieces and to prevent the branch ropes 30 from being drawn through the eyes 34.

The operation of the gate actuating mechanism is as follows: First assume that the gate is closed, as shown in Fig. 2, and the person in a carriage or wagon at one side or the other of the gate takes hold of the depending end of the adjacent branch rope 30 and pulls downward thereon. This will cause the latch dog 23 to engage the outer extremity of the loop 21 with one of its shoulders 28 so that as the latch lever 22 is moved upward and toward the right in respect to Fig. 2, the weighted lever 17 will also be moved upward and toward the right and, through the link 19, will draw the gate 1 from its closed toward its open position. The weighted lever 17 and the V-shaped gate supporting frame 4 will pass their vertical dead centers at approximately the same time and when moved beyond their dead centers their weight will be exerted as a force which will accelerate the complete opening movement of the gate, without requiring the rope to be pulled until the gate is entirely open. When the weighted lever 17 reaches or closely approaches the limit of its extreme movement toward the right, or in the position shown in Fig. 3, the latch dog 23 will be released from the left hand extremity of the loop 21 and the lever 22 will drop by gravity into the position shown in Fig. 3, in which position the lower shoulder 28 of said latch dog will engage the right hand extremity of the loop 21 when again pulled by drawing on one or the other of the branch ropes 30. When the gate is to be moved from its open into its closed position, one or the other of the branch ropes 30 will, of course, be drawn downward so as to cause the latch dog 23 to engage the right hand extremity of the loop 21 and thereby force the lever 17 upward and toward the left, and this, through the link 19 will, of course, move the gate from its open toward its closed position. When the weighted lever 17 and the frame 4 have been moved toward the left beyond their vertical dead centers, the force of gravity will accelerate the closing movement of the gate so that it will not be necessary to pull on the rope 30 until the gate has been completely opened.

From the above description it is, of course, evident that the latch-equipped lever automatically moves into engagement with the end of the loop 21 which is turned downward when the gate has assumed one of its extreme positions, and hence, is ready for action to move the gate toward its other extreme position when either one of the ropes 30 is drawn downward.

A gate suspended and operated as above described is capable of being very easily moved from its open to its closed position, and vice versa, and complete movements of the gate are insured, because it is only necessary to positively force the gate a little more than one half the distance from the one to the other position, the rest of said movement being effected by gravity. There is, therefore, no danger of the gate being left partly open and partly closed.

What I claim is:

1. The combination with a gate support pivoted at its lower portion for movement from one side to the other of a dead center, a gate, a pair of links suspending said gate from the upper portion of said pivoted support, a guide rail engageable with a part carried by one end of said gate, and means for moving said support from one side to the other of a dead center.

2. The combination with a gate support pivoted at its lower portion for movements from one side to the other of a dead center, a gate, a pair of links suspending said gate from the upper portion of said gate support, a horizontal guide rail engageable with a part carried by one end of said gate to maintain said gate in a horizontal position, a gate actuating lever connected to said gate and movable from one side to the other of a dead center, a latch-equipped lever alternately engageable with distant parts of said gate-actuating lever, and an operating cable connected to said latch lever, substantially as described.

3. The combination with a gate support pivoted at its lower portion for movements from one side to the other of a dead center, a gate, a pair of links suspending said gate from the upper portions of said supporting frame, a horizontal guide rail engageable with a part carried at one end of said gate, a weighted gate-actuating lever movable from one side to the other of a dead center, a link connecting said weighted lever to said gate, a loop or slotted latch frame carried by said weighted lever, a latch lever provided with a reversely acting latch dog alternately engageable with the opposite ends of said loop or latch frame, an actuating cable connected to said latch dog, and a suitable support and guides for said cable, substantially as described.

In testimony whereof I affix my signature in presence of two witnesses.

ROBERT R. HAGE.

Witnesses:
FRANK P. MILLER,
C. R. ALLISON.